US008972075B2

(12) United States Patent
Demirdelen

(10) Patent No.: US 8,972,075 B2
(45) Date of Patent: Mar. 3, 2015

(54) METHOD FOR CONTROLLING THE TEMPERATURE OF A GLOW PLUG

(75) Inventor: Ismet Demirdelen, Karlsruhe (DE)

(73) Assignee: BorgWarner BERU Systems, GmbH, Ludwigsburg (DE)

( * ) Notice: Subject to any disclaimer, the term of this patent is extended or adjusted under 35 U.S.C. 154(b) by 652 days.

(21) Appl. No.: 12/784,070

(22) Filed: May 20, 2010

(65) Prior Publication Data

US 2010/0312416 A1 Dec. 9, 2010

(30) Foreign Application Priority Data

Jun. 4, 2009 (DE) ......................... 10 2009 021 138

(51) Int. Cl.
*G05D 23/00* (2006.01)
*F02P 19/02* (2006.01)
*F02D 41/14* (2006.01)

(52) U.S. Cl.
CPC ....... *F02P 19/025* (2013.01); *F02D 2041/1416* (2013.01); *F02P 19/022* (2013.01)
USPC ......................... 700/299; 123/179.6; 219/497

(58) Field of Classification Search
USPC ........ 700/299–300; 123/179.6; 219/497, 500; 701/48
See application file for complete search history.

(56) References Cited

U.S. PATENT DOCUMENTS 4,607,153 A * 8/1986 Ang et al. ..................... 219/497
5,327,870 A * 7/1994 Boisvert et al. ........... 123/145 A
5,507,255 A * 4/1996 Boisvert et al. ........... 123/145 A
(Continued)

FOREIGN PATENT DOCUMENTS

DE 10 2006 048 225 A1 4/2008
DE 10 2006 060 632 A1 6/2008
FR 2 910 564 A1 6/2008

*Primary Examiner* — Mohammad Ali
*Assistant Examiner* — Nathan Laughlin
(74) *Attorney, Agent, or Firm* — Hackler Daghighian & Martino

(57) ABSTRACT

The invention relates to a method for controlling the temperature of a glow plug (1), wherein a setpoint temperature ($T_{set}$) is used to determine a setpoint value ($R_{set}$) of a temperature-dependent electric variable and an effective voltage ($U_{eff}$) which is generated by pulse width modulation is applied to the glow plug (1) and is used as correcting variable. According to the invention, it is provided that a mathematical model (4) is used to calculate an expected value ($R_e$) of the electric variable, the electric variable is measured, a first error signal $e_1(t)$ is generated by evaluating the calculated value ($R_e$), a value calculated from the effective voltage ($U_{eff}$) and the error signal ($e_1(t)$) is used as the input variable of the mathematical model (4), wherein the mathematical model (4) uses the input variable to calculate an output variable (X) which defines the expected value ($R_e$) of the electric variable, and wherein the output variable (X) of the mathematical model (4) is used to calculate a corrected value for the effective voltage ($U_{eff}$) and the effective voltage ($U_{eff}$) is changed to the corrected value.

15 Claims, 1 Drawing Sheet

(56) References Cited

U.S. PATENT DOCUMENTS

| | | | | |
|---|---|---|---|---|
| 5,823,155 | A * | 10/1998 | Burner | 123/145 A |
| 6,009,369 | A * | 12/1999 | Boisvert et al. | 701/99 |
| 6,148,258 | A * | 11/2000 | Boisvert et al. | 701/99 |
| 6,878,903 | B2 * | 4/2005 | Duba | 219/270 |
| 7,431,004 | B2 * | 10/2008 | Kernwein et al. | 123/145 A |
| 7,512,469 | B2 * | 3/2009 | Tohdo et al. | 701/48 |
| 7,631,625 | B2 * | 12/2009 | De Pottey | 123/179.21 |
| 8,115,144 | B2 * | 2/2012 | Cassani et al. | 219/497 |
| 2009/0151338 | A1 * | 6/2009 | Li et al. | 60/295 |
| 2009/0183718 | A1 * | 7/2009 | Casasso et al. | 123/623 |
| 2009/0194070 | A1 * | 8/2009 | Dittus et al. | 123/406.55 |
| 2009/0289048 | A1 * | 11/2009 | Casasso et al. | 219/262 |
| 2009/0289051 | A1 * | 11/2009 | Cassani et al. | 219/497 |
| 2009/0294431 | A1 * | 12/2009 | Sakurai | 219/268 |

* cited by examiner

METHOD FOR CONTROLLING THE TEMPERATURE OF A GLOW PLUG

The invention relates to a method for controlling the temperature of a glow plug, wherein a setpoint temperature is used to determine a setpoint value of a temperature-dependent electric variable and an effective voltage which is generated through pulse width modulation is used as correcting variable.

Usually, methods for regulating or controlling the temperature of a glow plug use the electric resistance or—this being equivalent—the electric conductance as setpoint value. As a matter of principle, however, it is also possible to use other temperature-dependent electric variables, for example the inductance, in the stead of the electric resistance or the electric conductance.

It is an object of the invention to present a way of how the temperature of a glow plug can be quickly controlled to a setpoint value while the engine is running.

SUMMARY OF THE INVENTION

Contrary to conventional PID control methods, the control method according to the invention does not compare a setpoint value of a temperature-dependent electric variable with an actual value nor does it change the effective voltage in relation to the instantaneous deviation and perhaps a previous deviation. Rather, a method according to the invention uses a mathematical model of a glow plug, said mathematical model being used to calculate an expected value of the electric variable. This model is based on feedback to the controlled system containing the glow plug, i.e. the correcting variable is changed in relation to the result of a comparison based on the output variable of the model and the setpoint value in order to reach the desired setpoint temperature or the desired setpoint value. Hence, the feedback required for a control is achieved via the output of the mathematical model, at which the output variable delivered by the model is provided.

An error signal which is used together with the value of the effective voltage to calculate an input variable for the mathematical model is generated by evaluating the calculated value, preferably by comparison with the measured value. Based on this input variable, the mathematical model calculates an output variable which defines the expected value of the electric variable.

Therein, the output variable of the model can directly be the expected value of the electric variable or just define said value, with the result that the expected value is determined from the output variable by means of a further calculation step, for example by multiplication by a constant factor. According to this, the comparison to be drawn on the basis of the output variable and the setpoint value can be made by comparing variables, for example voltage values, which are calculated from the setpoint value and the output variable or by comparing the setpoint value directly with the expected value.

The error signal is used to correct any modeling errors. Without external influences, i.e. interferences, the calculated value, therefore, finally is identical with the measured value after a time period the duration of which is dependent on the precision of the mathematical model. If there are interferences in the temperature of the plug, then this results in a deviation of the calculated variable from the measured variable. Since the input variable of the mathematical model is dependent on both the calculated value and the measured value, for example the difference between the measured and calculated values, the mathematical model follows the glow plug even then, i.e. the calculated value approximates the measured value even if interferences occur.

Interferences in the temperature of the plug can be corrected by means of a control method according to the invention much faster than this is possible with conventional control methods. That is to say that, according to conventional PID methods, the change in the correcting variable is not only dependent on the instantaneous deviation between the actual value and the setpoint value but also on previous deviations (I and/or D portion). Usually, however, interferences have nothing to do with previous deviations, with the result that the consideration of previous deviations often is no help in the treatment of interferences. On the other hand, even a mere proportional control can neither be used to achieve good results because the characteristic properties of a system can be included therein only poorly. In contrast, the control method according to the invention allows efficient and fast temperature control both in interference-free cases and in case interferences are occurring.

The mathematical model which is used to calculate an expected value of the electric variable can, for example, be formulated as a linear differential equation. In the simplest case, the mathematical model contains only two parameters which are characteristic of a given glow plug and the installation environment thereof. The first constant is used to weight the current value of the variable to be calculated, a second constant is used to weight the correcting variable, that is the effective voltage.

In a method according the invention, the electric resistance or—this being equivalent—the electric conductance is, preferably, used as the temperature-dependent electric variable. Therein, the electric resistance or the electric conductance, respectively, of the glow plug can be used including feed lines. But, as a matter of course, it is also possible to take the electric resistance or the conductance, respectively, of the glow plug into consideration without any contributions of feed lines. As an alternative or in addition, it is also possible to use the inductance as the temperature-dependent electric variable.

An advantageous further development of the invention provides that a second error signal which is used to correct the setpoint value of the electric variable, for example the setpoint resistance, is generated by evaluating the calculated value. In this manner, the influence of interferences which are caused by vehicle operation while the engine is running can be treated even better. That is to say that, by adding a correction to the setpoint value, an interference can be compensated with particular efficiency and the desired setpoint temperature can be reached particularly quickly. If, for example, the interference causes an additional heating of the glow plug, i.e. an increase in temperature, the desired setpoint temperature can be reached more quickly by taking a somewhat smaller setpoint value as a basis for converting the setpoint value into a value of the effective voltage. In this manner, the additional energy input of an interference can be compensated by a lower heat output. For example, the correction of the setpoint value can be determined by means of a family of characteristics, from which a selection is made with the second error signal and the setpoint temperature or a setpoint value determined from the setpoint temperature being taken into consideration. That is to say that a second feedback is carried out with the second error signal.

This second feedback results in the fact that, according to the method, there are actually two control circuits each of which contains one control system containing the glow plug. A first control circuit is generated by the feedback of the output of the mathematical model. A second control circuit is generated by the feedback of the second error signal.

The second error signal can be generated by comparing the calculated value with the measured value, for example by calculating the difference, with the result that the second error signal is proportional to the difference between the two values.

However, it is also possible to determine the second error signal by using a further mathematical model of the glow plug, wherein the value of the effective voltage applied to the glow plug is used as the input variable of the further mathematical model and the second error signal is generated by comparing the output variables of the two models. That is to say that, according to this procedure, the input variable of the first model is dependent on both the effective voltage and the measured value whereas the input variable of the second model is only dependent on the effective voltage. Preferably, the two mathematical models are identical, which means that they carry out the same arithmetic operations with an input variable.

Surprisingly, the described use of two mathematical models is to advantage in that modeling errors have less influence. This is to advantage in that the quality of the control is less influenced by changed conditions, for example by the use of a given glow plug in a different engine or by a change of the glow plug type itself. The complexity of determining suitable parameters for the mathematical model of the described method can, therefore, be reduced, for example by appropriate trials, said complexity sometimes being considerable.

Apart from the method described above, the present invention also relates to a glow plug control unit which applies a method according to the invention during operation. Such a glow plug control unit can, for example, be realized by means of a memory and a control unit, for example a microprocessor, wherein a program which applies the method according to the invention during operation is stored in the memory. The hardware components of such a glow plug control unit can be identical with the hardware of commercially available glow plug control units.

BRIEF DESCRIPTION OF THE DRAWINGS

Further details and advantages of the invention are illustrated by means of exemplary embodiments and with reference being made to the accompanying drawings. Therein, identical elements and elements which are corresponding to each other are provided with identical reference symbols. In the drawings.

DETAILED DESCRIPTION

Figure 1:
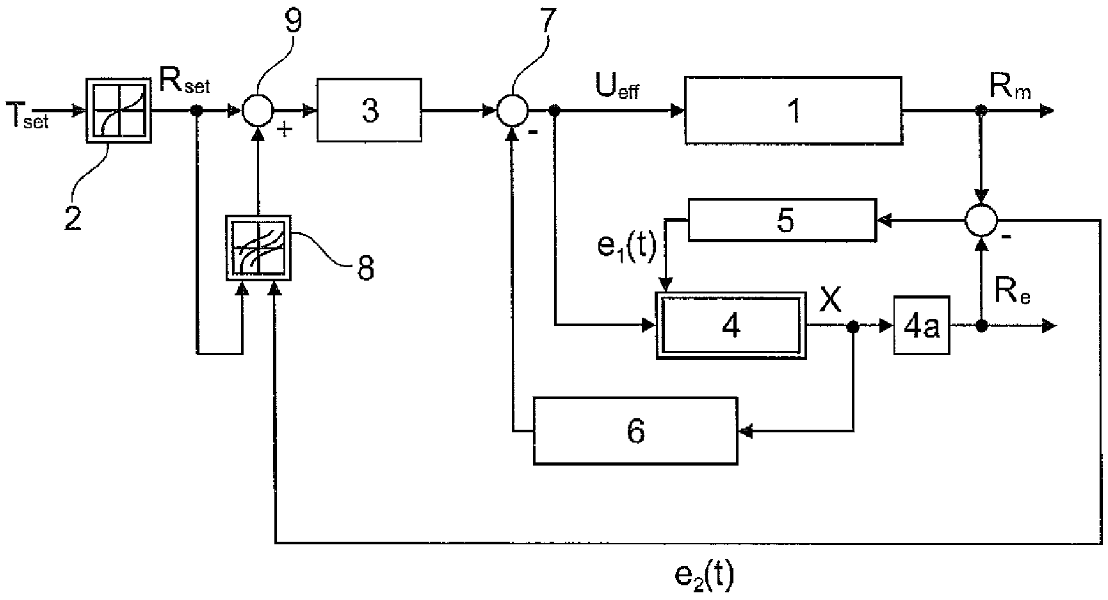
FIG. 1 shows a schematic diagram of an exemplary embodiment of a control method according to the invention.

FIG. 1 shows a schematic diagram of the flow of a method for controlling the temperature of a glow plug 1. In the control method shown, an effective voltage $U_{eff}$ which is generated from the electric system voltage of a vehicle through pulse width modulation is used as correcting variable. In the exemplary embodiment shown, the controlled variable used is the electric resistance $R_e$ of the glow plug 1. It is also possible to use any other temperature-dependent electric variable or a vector with a plurality of variables.

In the control method shown in FIG. 1, a first step consists of using a specified setpoint temperature $T_{set}$ to determine a setpoint value $R_{set}$ of the electric resistance of the glow plug, for example by means of a family of characteristics 2. The setpoint value $R_{set}$ is then taken to determine a value for the effective voltage $U_{eff}$ which is applied to the glow plug 1. The conversion of the setpoint value $R_{set}$ into a value for the effective voltage $U_{eff}$ can, for example, be made by means of a pre-filter 3 or a characteristic curve.

A mathematical model 4 is used to calculate an expected value $R_e$ of the electric resistance from the effective voltage $U_{eff}$ applied to the glow plug 1. The mathematical model 4 could directly deliver the expected value as output variable. However, in the exemplary embodiment shown, the model 4 delivers an output variable X which is used to calculate the expected value $R_e$ of the electric variable in a further step 4*a*, preferably by multiplication by a constant.

By evaluating the calculated value $R_e$, a first error signal $e_1(t)$ is generated in a method step 5. To achieve this, the calculated value $R_e$ is compared with a measured value $R_m$ of the resistance. To calculate the first error signal $e_1(t)$, it is, for example, possible to subtract the calculated resistance value $R_e$ from the measured resistance value $R_m$, as indicated by the minus sign (−) in FIG. 1. The result of such a calculation can be weighted with a suitable factor which can be determined empirically. The first error signal $e_1(t)$ is then proportional to the difference between the measured resistance value $R_m$ and the calculated resistance value $R_e$.

The value used as the input variable of the mathematical model 4 is a value calculated from the value of the effective voltage $U_{eff}$ and the first error signal $e_1(t)$. Such a mathematical model 4 the input variable of which is dependent on a comparison between a calculated value and a measured value is referred to as Luenberger observer.

The output variable X of the mathematical model 4 and the setpoint value $R_{set}$ are used to calculate a corrected value for the effective voltage $U_{eff}$. The effective voltage $U_{eff}$ is then changed to the corrected value. If the output variable X is, at the same time, the expected value $R_e$, the output variable can be directly compared with the setpoint value $R_{set}$ and the effective voltage $U_{eff}$ can be changed according to the result of the comparison, for example proportional to the amount of the difference. In general, it is sufficient to feedback the output of the model 4 to an input of a controller, that means to carry out a feedback of the model output.

If the output variable X does not correspond to the expected value $R_e$, this being the case in the exemplary embodiment shown, the output variable X is, initially, used to calculate a resistance value or a voltage value in a method step 6 which can be referred to as state controller or feedback matrix. In this method step the setpoint value $R_{set}$ or a variable determined from the setpoint value $R_{set}$, i.e. the present effective voltage $U_{eff}$, is compared with said calculated resistance value or voltage value. The effective voltage $U_{eff}$ is changed according to the result of this comparison. Therein, a voltage value which is proportional to the difference between the setpoint value $R_{set}$ and the calculated value $R_e$ is, preferably, added to the instantaneous value of the effective voltage ($U_{eff}$). The comparison and the change in the effective voltage $U_{eff}$ in relation to the difference determined therein are shown as method step 7 in FIG. 1.

A second error signal $e_2(t)$ which is used to correct the setpoint value $R_{set}$ is determined by evaluating the calculated value $R_e$. To achieve this, the setpoint value $R_{set}$ determined from the setpoint temperature $T_{set}$ is used together with the second error signal $e_2(t)$ to determine an adjusted setpoint value, for example by means of a family of characteristics 8. Preferably, a correction of the setpoint value $R_{set}$ is determined therein, said correction being added to the setpoint value $R_{set}$, as this is indicated by the method step 9 in FIG. 1. Subsequently, the corrected setpoint value is converted into a value for the effective voltage $U_{eff}$, for example by means of a pre-filter 3 or a characteristic curve. As the case may be the value of the effective voltage $U_{eff}$ thus determined is adjusted in the method step 7, with the output variable X being taken into consideration.

A differential equation, more particularly a linear differential equation, can be used as the mathematical model 4. For example, the following calculation rule can be used as the model 4: $dR/dt=A\cdot R+B\cdot U_{eff}(t)$. In general, it is also possible to use another electric variable or a vector from a plurality of electric variables as the controlled variable $\underline{x}$ in the stead of the resistance R, with the result that the mathematical model can be written in a more general form, i.e. $d\underline{x}/dt=A\cdot\underline{x}+B\cdot\underline{u}(t)$, wherein $\underline{u}$ is the correcting variable.

The calculation of a voltage value from the output variable X of the model 4 can, for example, be determined by multiplication by a constant the value of which can be determined by trial and error.

In the exemplary embodiment shown, the second error signal $e_2(t)$ is determined by comparing the measured value with the calculated value, similarly to the first error signal $e_1(t)$, for example by calculating the difference and multiplying the difference by a weighting factor.

The control method according to the invention actually contains two control circuits. A first control circuit contains the glow plug 1 and the model 4; in the exemplary embodiment shown, this first control circuit contains the glow plug 1, the method step 5, the model 4, and the method steps 6 and 7. A second control circuit contains the glow plug 1 and the feedback of the second error signal.

Figure 2:
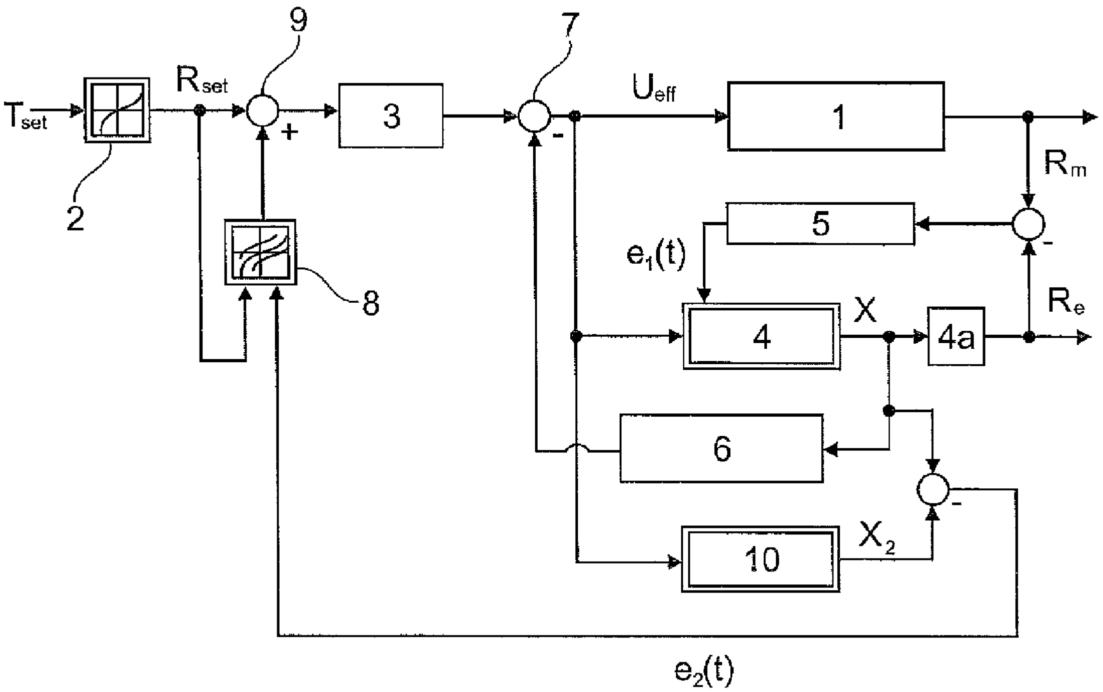
FIG. 2 shows a further exemplary embodiment of a control method according to the invention.

FIG. 2 shows a further exemplary embodiment of a method for controlling the temperature of a glow plug 1. Primarily, this method differs from the aforementioned method which has been illustrated by means of FIG. 1 in that the value of the effective voltage $U_{eff}$ applied to the glow plug 1 is used to calculate an output variable X2 by means of a further mathematical model 10 of the glow plug 1. Therein, the calculation rules of the two models 4, 10 can be identical. In the second model 10, however, the effective voltage $U_{eff}$ applied to the glow plug is directly used as the input variable whereas, in the first model, the input variable is calculated from the first error signal $e_1(t)$ and the effective voltage $U_{eff}$.

In the exemplary embodiment shown in FIG. 2, the second error signal $e_2(t)$ is determined by comparing the output variables X, X2 of the two models 4, 10, for example by calculating the difference, as this is indicated in FIG. 2. To calculate the second error signal $e_2(t)$, the amount of the difference can be multiplied by a constant factor. In the second exemplary embodiment, the second error signal $e_2(t)$, therefore, is the difference between the two output variables X, X2.

REFERENCE SYMBOLS

1 Glow plug
2 Family of characteristics
3 Pre-filter
4 First model
4*a* Method step
5 Method step
6 Method step
7 Method step
8 Family of characteristics
9 Method step
10 Second model
$U_{eff}$ Effective voltage
$T_{set}$ Setpoint temperature
$R_{set}$ Setpoint value
$R_e$ Expected resistance
$R_m$ Measured resistance
$e_1(t)$ First error signal
$e_2(t)$ Second error signal
X Output variable of the first model
X2 Output variable of the second model

What is claimed is:

1. A method for closed-loop controlling the temperature of a glow plug, wherein a) a setpoint temperature is used to determine a setpoint value of a temperature-dependent electric variable, and b) an effective voltage which is generated by pulse width modulation is applied to the glow plug, wherein c) a mathematical model comprising a linear differential equation, which calculates an output variable from an input variable and provides the output variable at its output, is used to calculate an expected value of the temperature-dependent electric variable, d) a measured value of the temperature-dependent electric variable is measured, e) a first error signal is generated by comparing the calculated expected value of the temperature-dependent electric variable with the measured value of the temperature-dependent electric variable, f) value calculated from the effective voltage and the first error signal is used as a new input variable of the mathematical model, wherein the mathematical model calculates a new output variable from the new input variable, said new output variable defining a new expected value of the temperature-dependent electric variable, and g) the new output variable of the mathematical model and the setpoint value of the temperature dependent electric variable are used to calculate a corrected value for the effective voltage and the effective voltage is changed to the corrected value thereby controlling the temperature of the glow plug, h) wherein the closed-loop controlling method repeats itself starting at step d.

2. The method according to claim 1, wherein the temperature-dependent electric variable is an electric resistance.

3. The method according to claim 1, wherein the output variable is proportional to the expected value of the electric variable.

4. The method according to claim 1, wherein to calculate the corrected value for the effective voltage, a value calculated from the output variable is compared with the setpoint value or with a variable determined from the setpoint value and the extent of the change in the effective voltage is the greater, the greater the difference determined in the comparison.

5. The method according to claim 1, wherein the corrected value for the effective voltage is calculated by adding a voltage value which is proportional to the difference between the setpoint value and the calculated value to the instantaneous value of the effective voltage.

6. The method according to claim 1, wherein a second error signal which is used to correct the setpoint value is generated by evaluating the calculated value.

7. The method according to claim 6, wherein the second error signal is generated by comparing the calculated value with the measured value.

8. The method according to claim 7, wherein the second error signal is proportional to the difference between the calculated value and the measured value.

9. The method according to claim 6, wherein use is made of a further mathematical model of the glow plug, wherein the value of the effective voltage applied to the glow plug is used as the input variable of the further mathematical model and the second error signal is generated by comparing the output variables of the two models.

10. The method according to claim 9, wherein the second error signal is proportional to the difference between the two output variables.

11. The method according to claim 9, wherein the two mathematical models are identical.

12. The method according to claim 6, wherein the second error signal and the setpoint value are used to determine a correction of the setpoint value by means of a family of characteristics.

13. The method according to claim 1, wherein to calculate the input variable, the first error signal is combined with the value of the effective voltage in an additive manner.

14. The method according to claim 1, wherein the temperature-dependent electric variable is an electric conductance.

15. The method according to claim 1, wherein the temperature-dependent electric variable is an inductance.

* * * * *